April 22, 1958 D. A. CHEYETTE ET AL 2,831,640
PNEUMATIC SEAL FOR GYRATORY CRUSHERS
Original Filed Oct. 27, 1950 5 Sheets-Sheet 1

Inventors
David A. Cheyette
Howard M. Zoerb
by Parker & Carter
Attorneys.

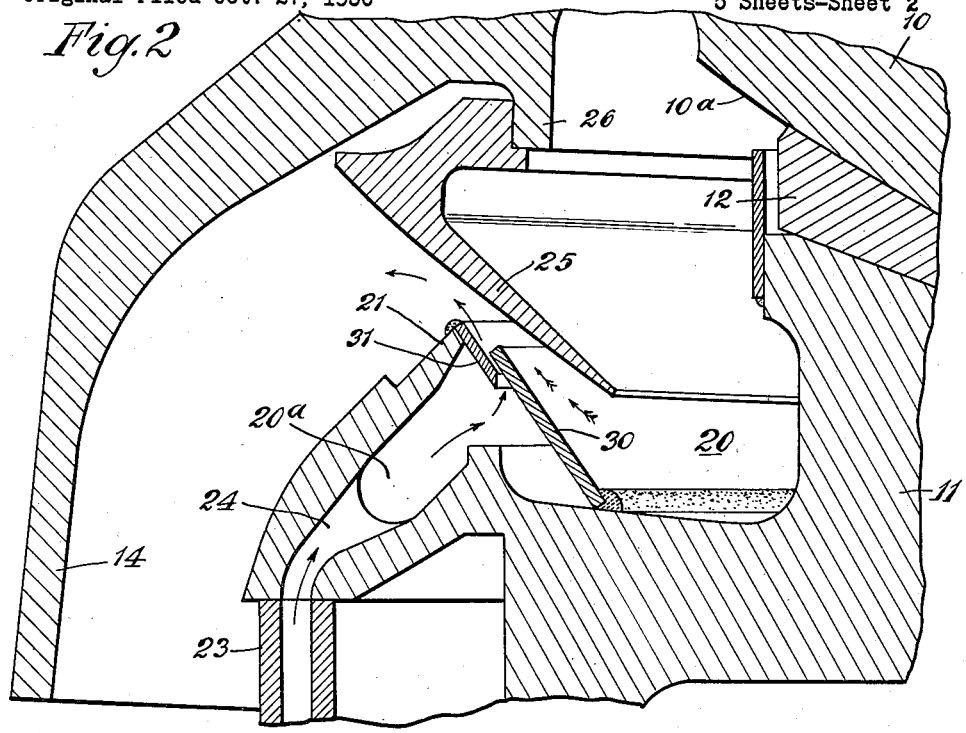
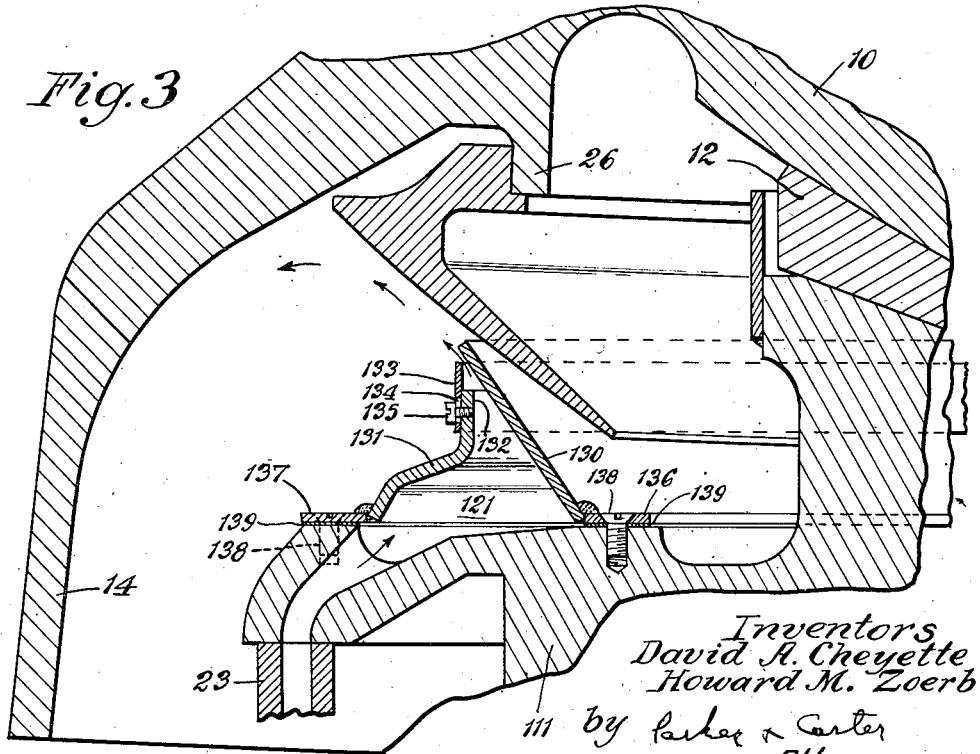

Inventor
David A. Cheyette
Howard M. Zoerb
by Parker & Carter
Attorneys

April 22, 1958 D. A. CHEYETTE ET AL 2,831,640
PNEUMATIC SEAL FOR GYRATORY CRUSHERS
Original Filed Oct. 27, 1950 5 Sheets-Sheet 5

Inventors
David A. Cheyette
Howard M. Zoerb
by Parker & Carter
Attorneys

2,831,640

PNEUMATIC SEAL FOR GYRATORY CRUSHERS

David A. Cheyette and Howard M. Zoerb, Milwaukee, Wis., assignors to Nordberg Manufacturing Company, Milwaukee, Wis., a corporation of Wisconsin Application November 18, 1954, Serial No. 469,799

8 Claims. (Cl. 241—216)

Our invention relates to improvements in pneumatic seals for gyratory crushers and has for one purpose to provide an improved pneumatic seal for the bowl and socket bearing of the gyrated head of such a crusher.

Another purpose is to provide a circumferential pneumatic seal which, with the contact between opposed relatively moving parts, maintains a cleansing, sealing circumferential outward flow of air between opposed parts of a gyrated head and of the support for such head.

Another purpose is to provide such a circumferential pneumatic seal, of the type above described, with means for adjusting the air gap between the relatively moving parts.

Another purpose is to provide a pneumatic seal in the form of an upwardly, outwardly directed flow of air, extending circumferentially about the zone to be sealed.

Another purpose is to provide a circumferential pneumatic seal employing an annular air jet, the orifice of which may be adjusted.

Another purpose is to provide a dust sealing structure which shall be effective to prevent the entry of dust and which shall be effective to automatically compensate for the wear of certain relatively movable parts.

Another purpose is to provide a pneumatic seal which shall be effective to prevent the entry or passage of dust to relatively moving parts, the structure of the seal forming members being effective to create an aspiration outwardly from the area surrounding the parts to be protected.

Another purpose is to provide a seal wherein an oil mist may be created about the parts to be protected.

Other purposes will appear from time to time in the course of the specification and claims.

The invention is illustrated more or less diagrammatically in the accompanying drawings, wherein:

Figure 2 is a radial section, on an enlarged scale, illustrating the structure of Figure 1;

Figure 3 is a similar section illustrating a variation;

Like parts are indicated by like symbols throughout the specification and drawings.

Figure 1:
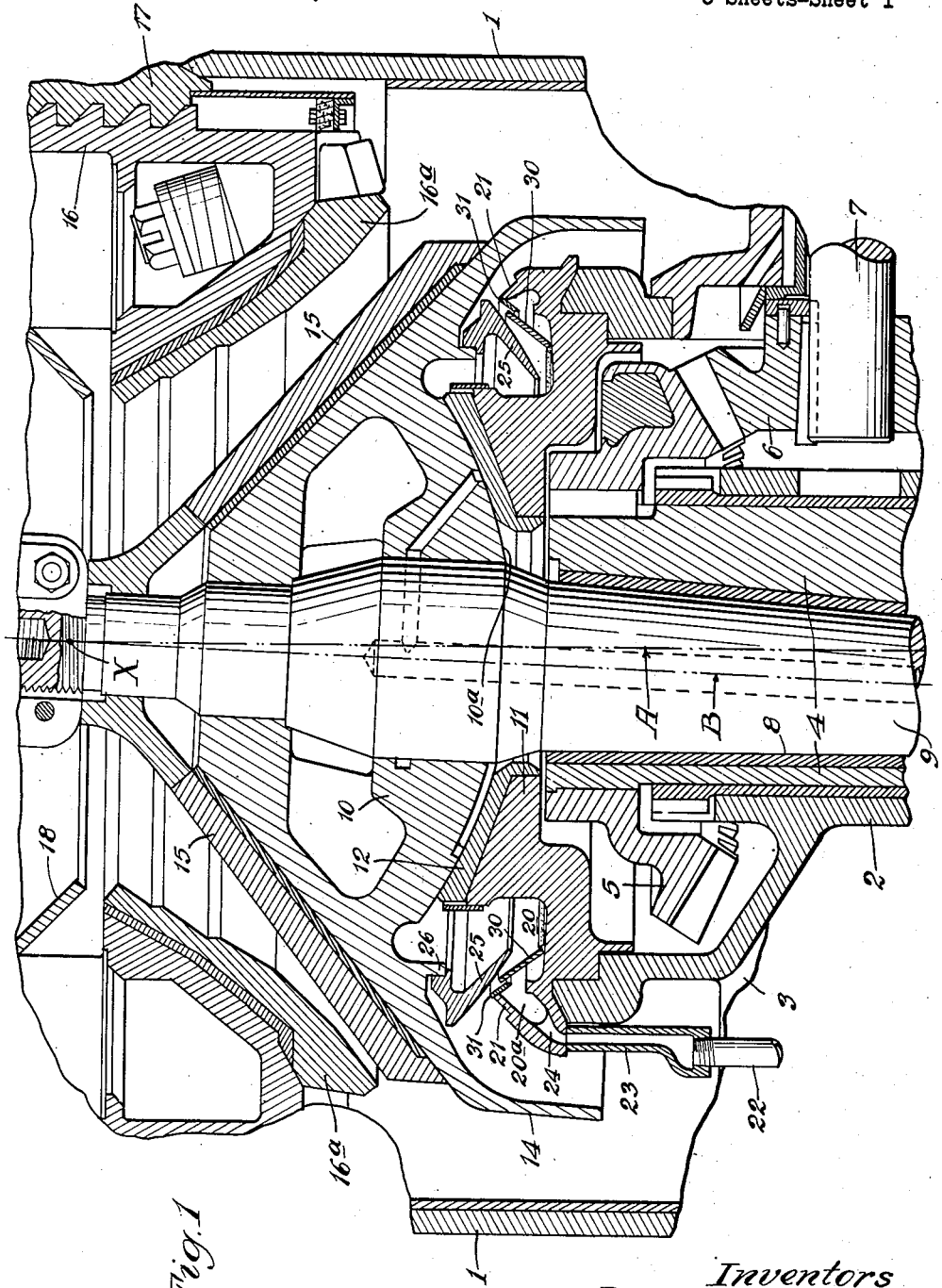
Figure 1 is a partial vertical axial section.

The present application is a continuation in part of our application, Serial Number 192,575, filed October 27, 1950, for "Pneumatic Seal for Gyratory Crushers," now abandoned.

Referring to the drawings, 1 generally indicates the circumferential frame of a gyratory crusher and 2 represents the central inner hub or bearing sleeve which may be connected to the outer circumferential frame by any suitable, generally radial spider members 3. 4 is a cylindrical sleeve, rotatably mounted within the fixed sleeve or hub or bearing 2. Keyed to the upper end of the sleeve 4 is any suitable beveled gear 5, in mesh with the pinion 6, on a drive shaft 7 which, it will be understood, may be driven from any suitable source of power, not herein shown. It will be understood that, in response to the rotation of the drive shaft 7, the sleeve 4 is rotated within the bearing 2. The sleeve 4 is eccentrically apertured, as at 8, to receive the downwardly tapered crushing shaft 9. The axis of the crushing shaft is indicated at B and the axis of the rotation of the sleeve 4 is indicated at A. The two axes intersect at the point X, whereby the head 10, mounted at the upper end of the shaft 9, receives a gyratory movement about the center X.

11 is any suitable supporting structure for the head 10 and carries a bearing plate or socket 12, having an upwardly concave generally spherical bearing surface, which receives and conforms to a downwardly convex bearing surface 10a on the head 10. The head includes an outwardly and downwardly extending hood or apron 14.

Mounted on the head is any suitable crushing mantle 15. Opposed to it is a bowl liner 16a, mounted on any suitable bowl 16. The bowl is adjustable on a supporting ring 17, only part of which is shown, but which is suitably supported at the upper edge of the circumferential frame member 1.

It will be understood that the crushing cavity between the opposed members 15 and 16a receives material from above, for example from the hopper or deflector 18. The material is crushed by a zone of approach of the mantle 15 to the liner 16a, which moves successively about the crushing cavity in response to the gyration of the head 10 and the shaft 9 and by rotation of the sleeve 4.

It is important that the opposed bearing surfaces 10a and 12 be protected from dust. We find it advantageous to maintain a continuous outward flow of air circumferentially about a lower portion of the head. It will be noted that the support 11 has a species of trough portion or open topped circumferential chamber 20. It is shown as bounded on its outer side by an outer wall portion 21. A suitable fluid may be delivered to the trough so formed from any suitable pipe 22, through the connection member 23, and the duct 24. The structure is well adapted for example to maintaining a water seal, when water is used and the sealing member or guide 25 is secured to a lower portion of the head 10, for example by engaging and being secured to the circumferential downwardly extending flange 26. When water is delivered through the pipe 22, it is possible to maintain a body of water in the trough 20, the level of which is basically controlled by the upper edge of the circumferential wall of flange 21. The member 25 is so shaped and proportioned that its lower inner edge is at all times below the level of the water in the trough 20 by reason of its extension below the top of outer wall 21. However, it is also advantageous to employ air as a sealing medium instead of water, and our previous structures can be modified from water seal use to render them adaptable for air seal use. In such case, we find it advantageous to isolate part of the trough space 20 and to employ it as a circumferential plenum chamber 20a for the supply of a sealing flow of air.

The space 20a is shown as inwardly bounded by a lower inner partition ring 30 secured at its lower edge to the bottom of the trough 20 and by an upper outer partition or wall 31, secured by its upper outer edge to the upper inner edge of the wall or flange 21. The members 30 and 31 may overlap slightly and then define a relatively restricted throat or slot which extends entirely around the plenum chamber 20a. The parts are so shaped and proportioned that this slot directs upwardly and outwardly a circumferentially continuous but restricted flow of air which impinges against and moves outwardly across the lower outer surface of the member 25 at all positions of the member 25. Thus at all positions of the head 10, a restricted and therefore accelerated or powerful stream of air is flowing upwardly and outwardly across the surface 25 and is preventing the ingress of dust particles or the like.

The sealing effect is heightened by the fact that the overhanging eaves 14 of the head extend down a substantial distance about and below the outlet of the sealing flow of air. There is thus little chance for the entrance of dust particles and the sealing is highly effective. It should also be kept in mind that the air flow thus provided tends to entrain air from the constricted passage between the member 25 and the upper inner surface of the partitions 30 and 31. Thus it will be seen that in addition to blowing dust or dirt away from the member 25, the position of the air blast between partitions 30 and 31 creates suction in the passage between partition 30 and member 25 in the manner of an aspirator. This will be clear, for example, by the direction of the flow indicated by arrows in Figure 2. In practice, the dust leakage to the bearing surfaces of the opposed members 10 and 12 is negligible and insufficient to cause excessive or damaging wear of the opposed bearing surfaces.

The structure of Figure 2 indicates basically an application of our invention to a crusher which was originally built for or intended for use with a water seal. However, while the air seal as shown is adequate and efficient, we illustrate in Figure 3 a design which has some advantages over the design of Figure 2 and which indicates a sealing structure initially intended for air operation.

In Figure 3 the head support 111 is shown as not depending on the outer wall 21 which serves as a circumferential dome for the water seal. Instead, a plenum chamber 121 is provided by an inner outwardly and upwardly inclined circumferential wall 130. An outer upwardly and inwardly extending wall 131 substantially completes the plenum chamber providing with wall 130 a pair of upwardly converging walls. We find it advantageous, however, to provide adjustment by having a cylindrical upper portion 132 on the wall 131, to which a cylindrical adjusting ring 133 is adjustably secured by means of any suitable slots 134 and adjusting screws or bolts 135. The entire air seal structure may be readily applied or removed. For example, an inner securing ring 136 carries the wall 130 welded or otherwise secured to it and an outer ring 137 similarly carries the wall 131. The rings may be removed or held in place by any suitable screws 138. If desired, gaskets 139 may be employed.

Figure 4:
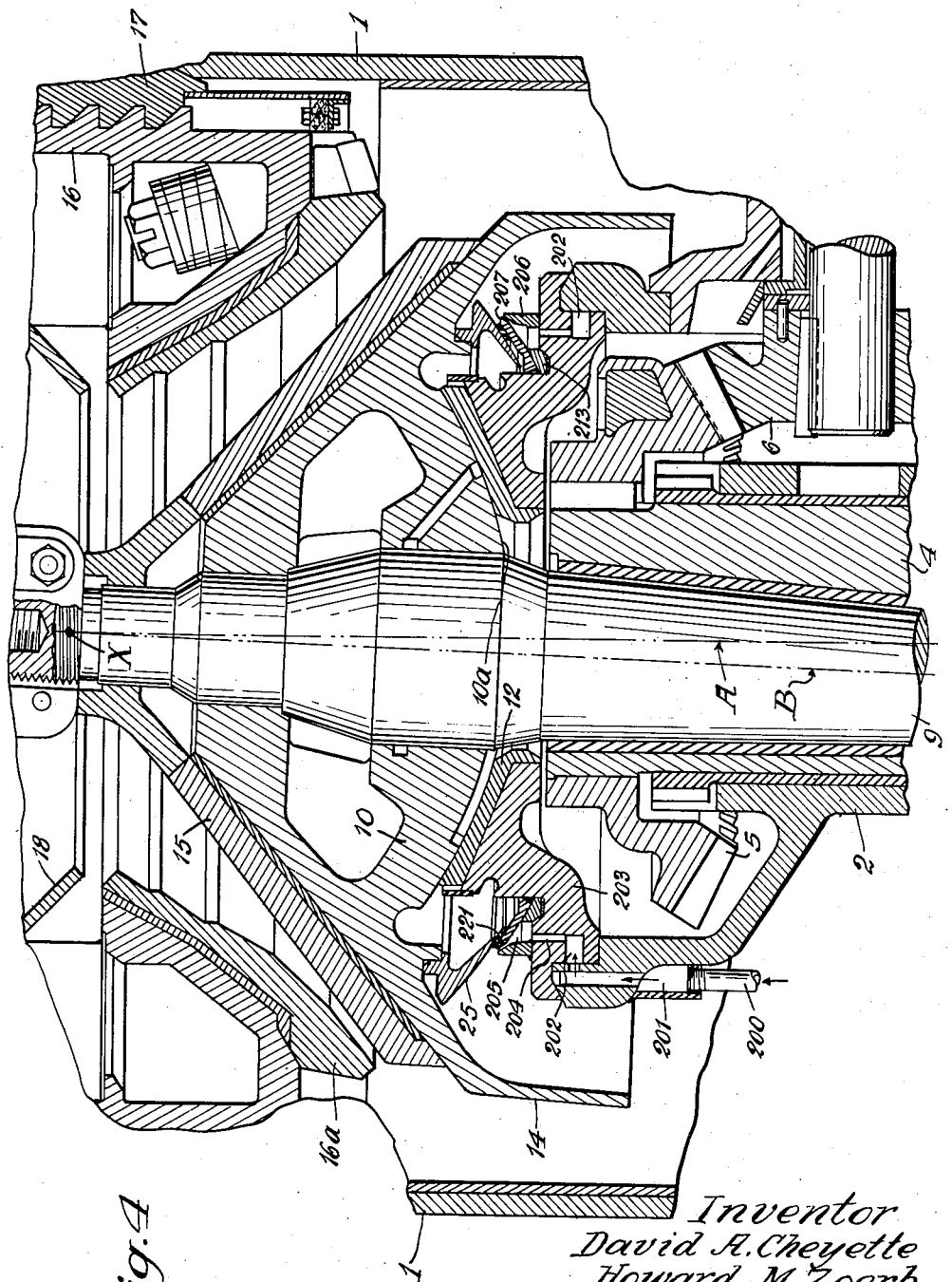
Figure 4 is a side view in partial cross-section illustrating a varying form of our device.
Figure 5:
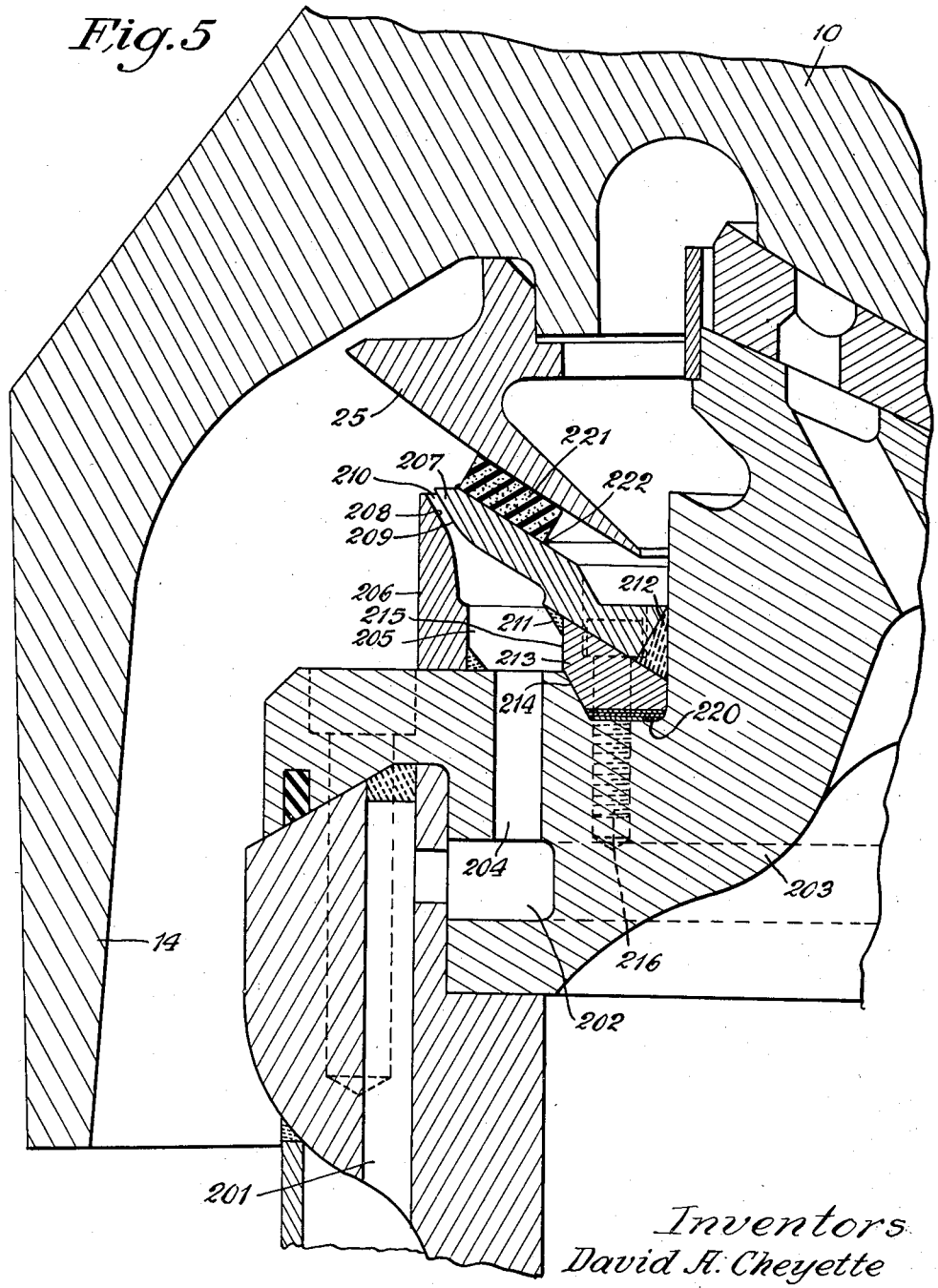
Figure 5 is a view in cross-section on a scale enlarged over that of Figure 4.

In Figures 4 and 5, we illustrate a variant form of our device. The crushing mechanism illustrated in Figure 4, corresponds generally to that of Figure 1. An air supply pipe 200 is provided in a manner similar to a pipe 22 in Figure 1. An air passage 201 leads to an annular air passage 202 formed internally of a bearing support ring 203. An air passage 204 leads from the chamber 202 to an annular plenum chamber 205 which is defined by a generally vertical annular ring 206 forming the outer wall of the plenum chamber and a downwardly, inwardly inclined annular top plenum chamber wall 207. It will be observed that the outer ends of the upstanding wall 206 and the inclined top wall 207 have upwardly, outwardly directed opposed annular faces 208, 209 which together form the jet orifice generally indicated by the number 210. The wall member 207 may have secured to its lower near face as by the welds 211, 212, a ring member 213 having its side walls formed to seat within a well 214 in the bearing support ring 203. A vertical outer side wall 215 of the ring 213 may serve to form an inner wall of the plenum chamber 205. A securing member 216 may serve to secure the top wall 207 and ring 213 in the bearing support ring 203. One or more shims 220 may be positioned in the bottom of the annular well 214 beneath the ring 213 to adjust the heighth of the ring 213 and wall 207 and thus to adjust the width of the annular jet orifice 210. A ring member 221, which may be formed of flexible material, for example, such as sponge rubber, may be secured to the upper inclined surface of the wall 207 as indicated generally at 222. The wear-absorbing ring 221 may be cemented to the member 207 by any suitable means, such for example, as a satisfactory adhesive or it may be vulcanized. While the ring 221 is illustrated only by cross-section in Figure 5, it can be seen from a view of a left-hand portion of Figure 4 that the ring 221 is of continuous circular extension about the upper surface of the ring 207. As best seen in Figures 4 and 5, the skirt 25, secured to the crushing head 10, has its under or outer surface riding upon the upper surface of the flexible ring 221.

Figure 6:
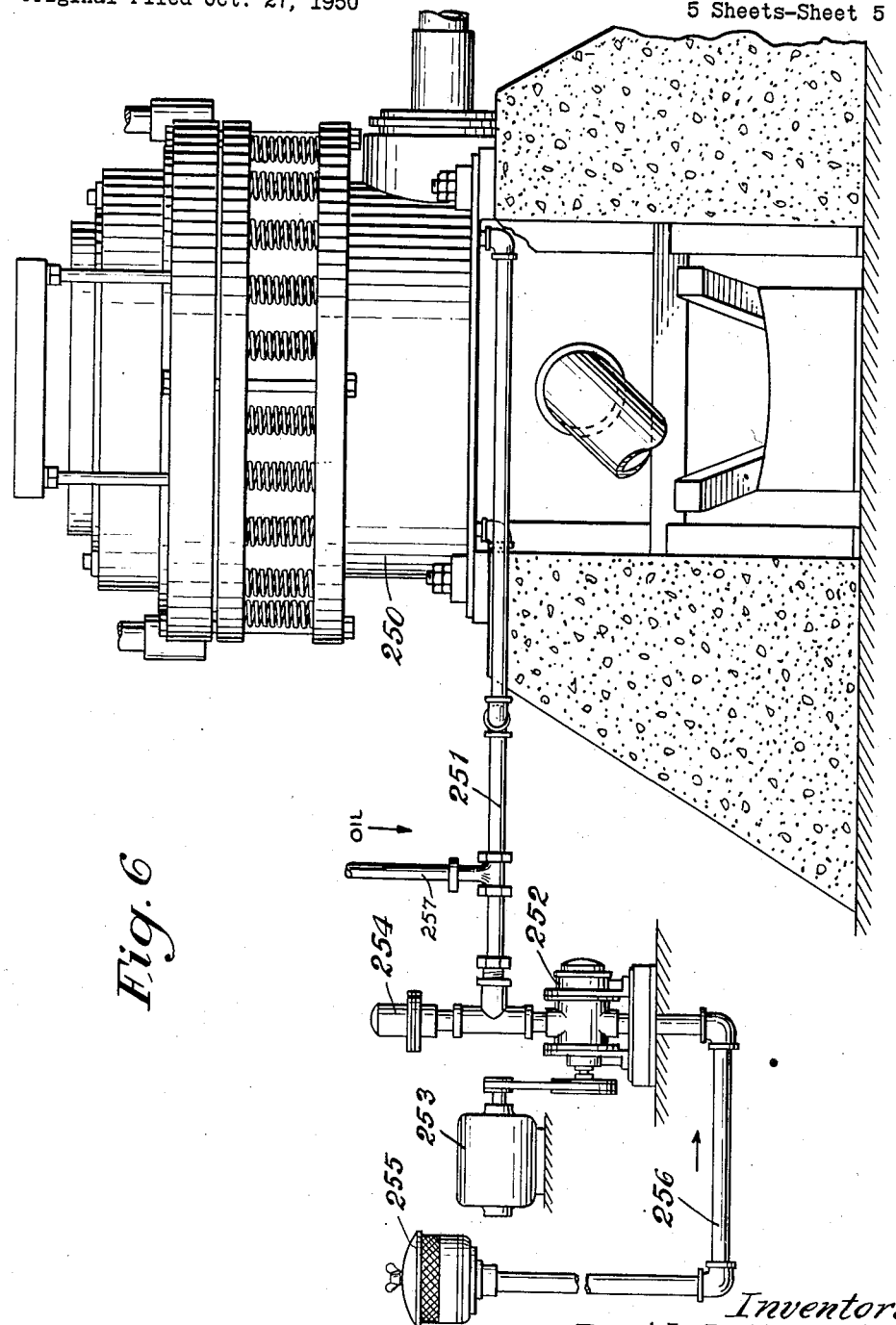
Figure 6 is a side elevation on a reduced scale and illustrating means for supplying air to the seal illustrated in Figures 1–5.

Referring now to Figure 6, the overall crushing mechanism is illustrated generally by the numeral 250. A pipe 251 may be employed to conduct air to one or more of the pipes 22 and 200 illustrated in the Figures 1 and 4. A compressor 252 which may be driven by any suitable power means 253 may be connected to the pipe 251 to supply air under pressure thereto. A pressure release mechanism 254 may be associated with the compressor 252 and the pipe 251. An air filter means 255 may be connected to a compressor inlet pipe 256. The air filter 255, as is well known, may have associated therewith, means for filtering the incoming air, such as mesh or fibrous materials which may be impregnated with oil in order to create an oil filament in the air to be eventually ejected through the orifice 210. When desired, an oiling means may be associated with the pipe 251 as is the member 254 in order to supply oil to the air down-stream of the compressor. Such an oiling means is shown for example as pipe 257 tapped into the upper side of pipe 251 which feeds oil from a source (not shown) under regulation of any suitable valve into pipe 251.

It will be realized that whereas we have described and claimed a practical and operative device, neverthless many changes may be made in size, shape, number and disposition of parts without departing from the spirit and scope of our invention. We therefore wish our description and drawings to be taken as in a broad sense illustrative or diagrammatic, rather than as limiting us to our specific showing herein.

The use and operation of our invention is as follows:

Our invention is readily applicable to changing or reconditioning water seal gyratory crushers for use as air seal crushers. In Figures 1 and 2, the original water seal structure, including the outer wall or lip 21, is left substantially intact, but the air directing walls 30 and 31 perform the dual function of completing the plenum chamber 20a and of providing directing means for directing air upwardly and outwardly against and along the surface of the member 25, which gyrates with the head 10. Any suitable means for maintaining a supply of the flow of air through the pipe 22 may be employed and does not form part of the invention.

Figure 3 illustrates a structure which is adaptable for initial application to a crusher of the type herein shown which is not adapted or intended for water seal use. In both forms, a plenum chamber is provided and a circumferential outlet for the plenum chamber positioned and adapted to direct air upwardly and outwardly against and along the lower surface of the member 25. In both forms, the inner wall of the plenum chamber converges with the outer surface of the member 25, and the direction of the air from the outlet slot tends to entrain air from the space surrounded by the plenum chamber.

Whereas we find it under many conditions advantageous or preferable to use air or its equivalent as the sole sealing fluid, circumstances at times arise where there is an advantage in additionally employing water, oil, or the like. For example, a mist of water or oil may be advantageous, in connection with compressed air or gas, not only to maintain an adequate seal, but to lay dust by introducing oil into the down-stream side of the compressor as through pipe 257.

In the form of our invention illustrated in Figures 4–6, we illustrate means for adjusting the size of the air orifice 210. The number of shims 220 beneath the ring 213 to which the top plenum wall 207 is secured may be varied to adjust the height of the wall 207 and thus to adjust the width of the orifices 210.

As illustrated best in Figure 5, we supply a wear-absorbing ring 221 which may be formed of sponge rubber upon which rides the deflector or flange 25 which is movable with the head 10. Thus the ring 221 serves not only as a sealing mechanism for the space between the flange 25 and the wall 207 but is effective to cushion the flange 25 and to continue to do so even though the spherical bearing or socket liner 12 of the head 10 may have become worn, causing the flange 25 to approach closer to the wall 207. The flange 25 may be considered also as a baffle or wiper ring.

The injection of oil into the air being forced under pressure between the orifice 210 provides an oil mist or vapor effective to prevent rust and corrosion of any moisture which may be entrained in the air.

We claim:

1. In a gyratory crusher and pneumatic sealing means therefor, a crushing head and means for gyrating it, a support for said head, a bearing structure intermediate said head and support, a dust excluding assembly exterior to said bearing structure, said assembly including normally and relatively fixed walls defining a plenum chamber, said plenum chamber having an outwardly upwardly inclined peripheral air delivery orifice positioned adjacent an upper portion of said plenum chamber and in communication therewith, said orifice being formed and adapted to direct outwardly a generally conic envelope of air, means for admitting air under pressure to the interior of the plenum chamber, the head having an apron extending upwardly and outwardly in a path generally outwardly converging with the path of delivery of said envelope of air, and moving in a path closely adjacent the orifice opening said apron and said air delivery path meeting at a point substantially beyond said delivery orifice, said apron having, at all positions of the head, a substantial upward and outward extension beyond the delivery orifice, whereby a scouring area of substantial radial extension is at all times provided, said apron having also, at all positions of the head, a substantial inward and downward extension within the area defined by said orifice and forming with said inner plenum chamber wall an outwardly converging aspirating passage said aspirating passage being, at all positions of the head, in alignment with the point at which said apron and said air delivery path meet.

2. In a gyratory crusher and pneumatic sealing means therefor, a crushing head and means for gyrating it, a support for said head, a bearing structure intermediate said head and support, a dust excluding assembly exterior to said bearing structure, said assembly including normally and relatively fixed walls defining a plenum chamber, the inner of said walls being generally conical and inclined upwardly and outwardly and forming with another of said plenum chamber walls, an upwardly, outwardly inclined annular air delivery slot, said air delivery slot being formed and adapted to direct outwardly a generally conic envelope of air, means for admitting air under pressure to the interior of the plenum chamber, the head having an apron extending upwardly and outwardly in a path generally outwardly converging with the path of delivery of said envelope of air, and moving in a path closely adjacent the slot opening said apron and said air delivery path converging toward a point spaced outwardly from the outer wall of said plenum chamber, said apron having, at all positions of the head, a substantial inward and downward extension within the area defined by said slot.

3. The structure of claim 2 characterized by and including a ring formed of flexible material and secured to the upper surface of said plenum chamber inner wall, the upper surface of said ring being in contact, at all positions of said head, with the outer surface of said apron.

4. The structure of claim 2, characterized by and including means for adjusting the width of said air delivery slot, said adjusting means comprising means for movably securing said inner plenum wall to a portion of said head support and a plurality of shims adapted to be positioned between said head support and said inner chamber wall.

5. In a gyratory crusher and pneumatic sealing means therefor, a crushing head and means for gyrating it, a support for said head, a bearing structure intermediate said head and support, a dust excluding assembly exterior to said bearing structure, said assembly including normally and relatively fixed walls defining a plenum chamber, the inner of said walls being generally conical and inclined upwardly and outwardly and forming with another of said plenum chamber walls an upwardly outwardly inclined annular air delivery slot, said air delivery slot being formed and adapted to direct outwardly a generally conic envelope of air, means for admitting air under pressure to the interior of the plenum chamber, and means for supplying oil to said air prior to its admission to said plenum chamber whereby a rust preventing oil mist is created in said air envelope.

6. The method of preventing rust in and at the same time excluding dust from the bearing structure of gyratory crushers and the like of the type in which a head having a downwardly spherical bearing surface seats on an upwardly spherical bearing socket, which comprises the steps of defining a circumferential exterior plenum chamber between the abutting spherical faces of head and socket and the ambient air, supplying a mixture of air and oil under pressure to the interior of said plenum chamber, and directing outwardly and upwardly from said plenum chamber a generally conic envelope of mixed air and oil.

7. The method of preventing rust in and at the same time excluding dust from the bearing structure of gyratory crushers and the like in which a head, on a support, is gyrated on a bearing assembly located beneath the head, which comprises the steps of defining a circumferential exterior plenum chamber between said bearing assembly and the ambient air, supplying a mixture of air and oil under pressure to the interior of said plenum chamber, and directing outwardly and upwardly from said plenum chamber a generally conic envelope of mixed air and oil and causing it to abut against a portion of said head, whereby said envelope is made to extend completely across any opening between head and support, and to constitute a protecting screen between the ambient air and said bearing assembly.

8. The method of preventing rust in, and at the same time excluding dust from, the bearing structure of gyratory crushers and the like of the type in which a head having a downwardly spherical bearing surface seats on an upwardly spherical bearing socket which comprises the steps of defining a circumferential exterior plenum chamber between the abutting spherical face of the socket and the ambient air and an interior aspirating chamber between the plenum chamber and the bearing socket, supplying a mixture of air and oil under pressure to the interior of said plenum chamber, directing outwardly and upwardly from said plenum chamber a generally conic envelope of mixed air and oil in order to constitute a protecting screen between the ambient air and said bearing assembly, and simultaneously inducing a vacuum in the inner aspirating chamber.

References Cited in the file of this patent

UNITED STATES PATENTS

| | | |
|---|---|---|
| 1,559,182 | Rice | Oct. 27, 1925 |
| 1,718,293 | Hoover | June 25, 1929 |
| 2,000,385 | Gruender | May 7, 1935 |
| 2,266,107 | Waterfill | Dec. 16, 1941 |
| 2,468,373 | Makaroff | Apr. 26, 1949 |
| 2,509,920 | Gruender | May 30, 1950 |